United States Patent
Li (10) Patent No.: US 10,409,095 B2
(45) Date of Patent: Sep. 10, 2019

(54) PARALLAX BARRIER, DISPLAY DEVICE AND DISPLAY STATE CONTROL METHOD THEREOF

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 71 days.

(21) Appl. No.: 15/847,372

(22) Filed: Dec. 19, 2017

(65) Prior Publication Data

US 2018/0173030 A1 Jun. 21, 2018

(30) Foreign Application Priority Data

Dec. 20, 2016 (CN) .......................... 2016 1 1183965

(51) Int. Cl.
*G02F 1/13* (2006.01)
*G09G 3/34* (2006.01)
(Continued)

(52) U.S. Cl.
CPC ....... *G02F 1/1323* (2013.01); *G02B 27/2214* (2013.01); *G02F 1/1368* (2013.01);
(Continued)

(58) Field of Classification Search
CPC ............... G09G 3/3648; G09G 3/3406; G09G 2354/00; G09G 2358/00; G09G 2320/028;
(Continued)

(56) References Cited

U.S. PATENT DOCUMENTS 5,315,377 A  5/1994 Isono
8,520,287 B2  8/2013 Lee et al.
(Continued)

FOREIGN PATENT DOCUMENTS

CN  202041727 U  11/2011
CN  102929049 A  2/2013
(Continued)

OTHER PUBLICATIONS

Russian Office Action issued in corresponding RU Patent Application No. 2018101703, dated Nov. 1, 2018, 7 pages.
(Continued)

*Primary Examiner* — Muhammad N Edun
(74) *Attorney, Agent, or Firm* — Arch & Lake LLP (57) ABSTRACT

A parallax barrier, a display device and a display state control method belong to the field of display technology. The parallax barrier includes: a sealed cavity and a first polarizer disposed on a light exiting side of the sealed cavity, wherein the sealed cavity includes: a first substrate and a second substrate and a liquid crystal layer provided between the two substrates, a first transparent electrode layer is provided on a surface of the first substrate, and the first transparent electrode layer is a plurality of transparent electrode blocks arranged in an array, and a second transparent electrode layer is provided on a surface of the second substrate, and a voltage difference to deflect liquid crystal is capable of forming between the second transparent electrode layer and the transparent electrode block. By controlling different transparent electrode blocks, the parallax barrier can protect privacy in two directions.

20 Claims, 8 Drawing Sheets (51) Int. Cl.
  *G09G 3/36* (2006.01)
  *G02B 27/22* (2018.01)
  *G02F 1/133* (2006.01)
  *G02F 1/1335* (2006.01)
  *G02F 1/1343* (2006.01)
  *G02F 1/1362* (2006.01)
  *G02F 1/1368* (2006.01)

(52) U.S. Cl.
  CPC ...... *G02F 1/13306* (2013.01); *G02F 1/13439* (2013.01); *G02F 1/133509* (2013.01); *G02F 1/133512* (2013.01); *G02F 1/133528* (2013.01); *G02F 1/134309* (2013.01); *G02F 1/136286* (2013.01); *G09G 3/3406* (2013.01); *G09G 3/3648* (2013.01); *G02F 2001/133531* (2013.01); *G02F 2203/62* (2013.01); *G09G 2320/028* (2013.01); *G09G 2354/00* (2013.01); *G09G 2358/00* (2013.01)

(58) Field of Classification Search
  CPC ........ G02F 1/133512; G02F 1/133528; G02F 1/136286; G02F 1/133509; G02F 1/1323; G02F 1/13306; G02F 1/1368; G02F 1/13439; G02F 1/134309; G02F 2001/133531; G02F 2203/62; G02B 27/2214
  See application file for complete search history.

(56) References Cited

U.S. PATENT DOCUMENTS

| | | | |
|---|---|---|---|
| 9,279,989 | B2 | 3/2016 | Song |
| 2011/0170026 | A1 | 7/2011 | Lin |
| 2011/0242150 | A1 | 10/2011 | Song et al. |
| 2012/0162744 | A1 | 6/2012 | Lee et al. |
| 2013/0321911 | A1* | 12/2013 | Yamayoshi ........ G02B 27/2214 359/462 |
| 2015/0029584 | A1* | 1/2015 | Song .................. G02F 1/29 359/463 |
| 2016/0246138 | A1 | 8/2016 | Tang |
| 2016/0341987 | A1 | 11/2016 | Chung et al. |
| 2017/0166813 | A1 | 6/2017 | Xie |
| 2017/0192263 | A1 | 7/2017 | Jiang et al. |

FOREIGN PATENT DOCUMENTS

| | | |
|---|---|---|
| CN | 104460138 A | 3/2015 |
| CN | 104865757 A | 8/2015 |
| CN | 104932167 A | 9/2015 |
| CN | 102736335 B | 1/2016 |
| CN | 105425480 A | 3/2016 |
| CN | 106405955 A | 2/2017 |
| CN | 106773162 A | 5/2017 |
| JP | 02179614 A | 7/1990 |
| JP | 06148677 A | 5/1994 |
| JP | H11352522 A | 12/1999 |
| JP | 2011043785 A | 3/2011 |
| JP | 2011141546 A | 7/2011 |
| JP | 2011169949 A | 9/2011 |
| JP | 2013041263 A | 2/2013 |
| JP | 2015001416 A | 1/2015 |
| JP | 2015118342 A | 6/2015 |
| RU | 2458375 C1 | 8/2012 |
| RU | 2490818 C1 | 8/2013 |
| TW | 201124769 A | 7/2011 |
| TW | 201305608 A | 2/2013 |
| WO | 2018113280 | 6/2018 |

OTHER PUBLICATIONS

Chinese Office Action (including English translation) issued in corresponding CN Patent Application No. 201611183965.4, dated Jan. 4, 2019, 8 pages.
Russian Office Action issued in corresponding RU Patent Application No. 2018101703, dated Jan. 17, 2019, 13 pages.
Extended European Search Report issued in corresponding European Application No. 17209041.7, dated May 2, 2018, 8 pages.
Japanese Office Action issued in corresponding JP Patent Application No. 2017-549393, dated Dec. 25, 2018, 3 pages.
International Search Report issued in corresponding International Application No. PCT/CN2017/093419, dated Oct. 12, 2017, 5 pages.

* cited by examiner

PARALLAX BARRIER, DISPLAY DEVICE AND DISPLAY STATE CONTROL METHOD THEREOF

CROSS-REFERENCE TO RELATED APPLICATION

This application claims priority to Chinese Patent Application No. 201611183965.4, filed on Dec. 20, 2016, the entire contents of which are incorporated herein by reference.

TECHNICAL FIELD

The present disclosure relates to the field of display technology, and particularly to a parallax barrier, a display device and a display state control method thereof.

BACKGROUND

At present, manufacturers tend to expand a viewable angle of a display device, to achieve content display of a wide viewable angle, so as to be convenient for a plurality of users to share and view the display content of the display device from different angles. However, when the display content contains private information, the user does not want the private information to be peeped by others. In that case, the wide viewable angle display effect of the display device cannot satisfy demand of the user at this time.

In the related art, the display device includes a display panel and a parallax barrier located on a light exiting surface of the display panel. The display device is further provided with a front camera. The display device detects position change of user pupil by the front camera, and adjusts the display content of the display device, such that the viewable angle of the display content can be limited by the parallax barrier, to ensure that the display content cannot be viewed within a certain range of angles.

During implementation of the present disclosure, the inventors have found that at least following problems exist in the related art:

at present, a direction for privacy protection by the parallax barrier is a fixed direction, so the reliability of privacy protection is low.

SUMMARY

In order to at least partially overcome problems in the related art that the reliability of privacy protection is low, the present disclosure provides a parallax barrier, a display device and a display state control method thereof. The technical scheme is as follows.

In a first aspect, there is provided a parallax barrier, including: a sealed cavity and a first polarizer disposed on a light exiting side of the sealed cavity. The sealed cavity includes: two substrates parallel to each other and a liquid crystal layer provided between the two substrates. The two substrates include a first substrate and a second substrate, where a first transparent electrode layer is provided on a surface of the first substrate close to the second substrate, and the first transparent electrode layer is a plurality of transparent electrode blocks arranged in an array along a first direction and a second direction. A second transparent electrode layer is provided on a surface of the second substrate close to the first substrate, and a voltage difference to deflect liquid crystal in the liquid crystal layer is capable of forming between the second transparent electrode layer and the transparent electrode block. A first switch is provided between any two adjacent transparent electrode blocks in the first direction, and a second switch is provided between any two adjacent transparent electrode blocks in the second direction. The liquid crystal layer controls whether a linearly-polarized light incident from a light entering side of the sealed cavity passes through the first polarizer or is filtered by the first polarizer.

In a second aspect, there is provided a display device, including: a display panel and a parallax barrier provided on a light emitting surface of the display panel, wherein the parallax barrier is the parallax barrier according to the first aspect.

In a third aspect, there is provided a display state control method, applied to any of the parallax barriers according to the first aspect or the second aspect, wherein the plurality of transparent electrode blocks are capable of being divided into a plurality of first electrode groups arranged in an array along a first direction, and each of the first electrode groups includes a plurality of transparent electrode blocks arranged in a second direction, or the plurality of transparent electrode blocks are capable of being divided into a plurality of second electrode groups arranged in an array along a second direction, and each of the second electrode groups includes a plurality of transparent electrode blocks arranged in a first direction, and the method includes:

acquiring a content display direction of the display device; and controlling the parallax barrier according to the content display direction to be in a target shielding state, wherein the target shielding state matches the content display direction, wherein the target shielding state is a first shielding state or a second shielding state, and the first shielding state is a state that the parallax barrier presents when a voltage difference for deflecting the liquid crystal is formed between one electrode group of any two adjacent first electrode groups of the plurality of first electrode groups and the second transparent electrode layer, and no voltage difference for deflecting the liquid crystal is formed between the other electrode group of the two adjacent first electrode groups of the plurality of first electrode groups and the second transparent electrode layer, and the second shielding state is a state that the parallax barrier presents when a voltage difference for deflecting the liquid crystal is formed between one electrode group of any two adjacent second electrode groups of the plurality of second electrode groups and the second transparent electrode layer, and no voltage difference for deflecting the liquid crystal is formed between the other electrode group of the two adjacent second electrode groups of the plurality of second electrode groups and the second transparent electrode layer The technical scheme provided by the present disclosure may have the following beneficial effects:

by controlling the plurality of transparent electrode blocks arranged in an array along the first direction and the second direction, liquid crystal in the parallax barrier corresponding to the transparent electrode blocks controlled in the first direction is deflected, or liquid crystal in the parallax barrier corresponding to the transparent electrode blocks controlled in the second direction is deflected, thus the parallax barrier can protect privacy in two directions, which improves flexibility and reliability of the privacy protection.

BRIEF DESCRIPTION OF THE DRAWINGS

In order to clarify the technical scheme of the present disclosure more clearly, the following drawings, which are

DETAILED DESCRIPTION

In order to make the purpose, technical scheme and advantages of the present disclosure more clear, the disclosure will now be described in further detail with reference to the accompanying drawings. The described embodiments are merely a portion of the embodiments of the present disclosure, rather than all embodiments. Based on the embodiments of the present disclosure, all other embodiments obtained by those skilled in the art without creative labor are within the protection scope of this disclosure.

Figure 1A:
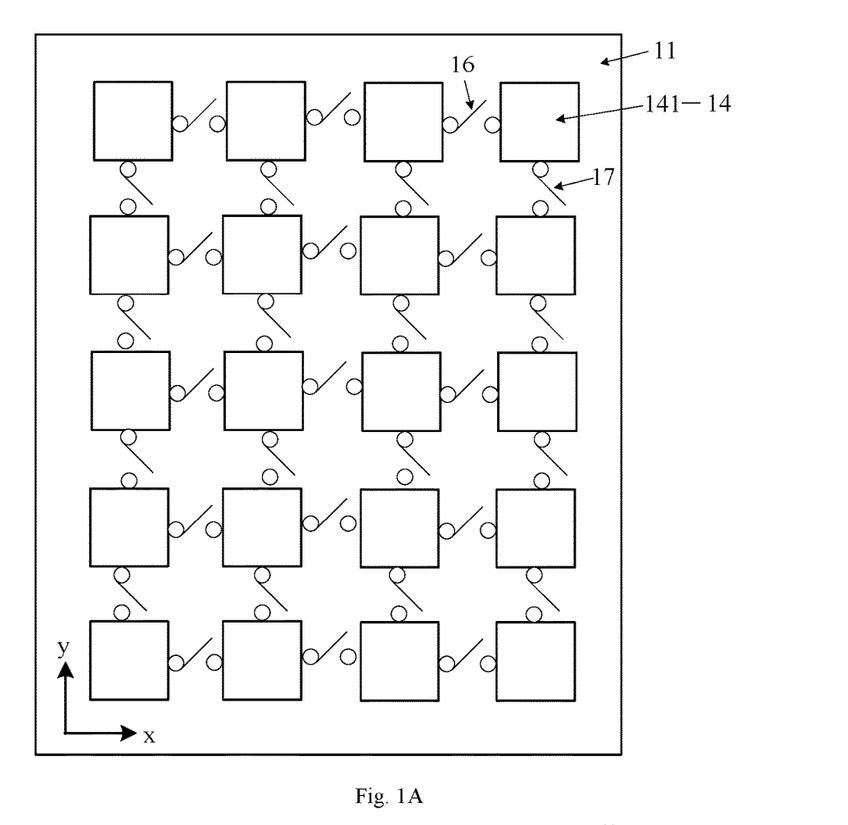
FIG. 1A is a schematic view of a plan structure of a parallax barrier provided by an exemplary embodiment of the present disclosure.
Figure 1B:
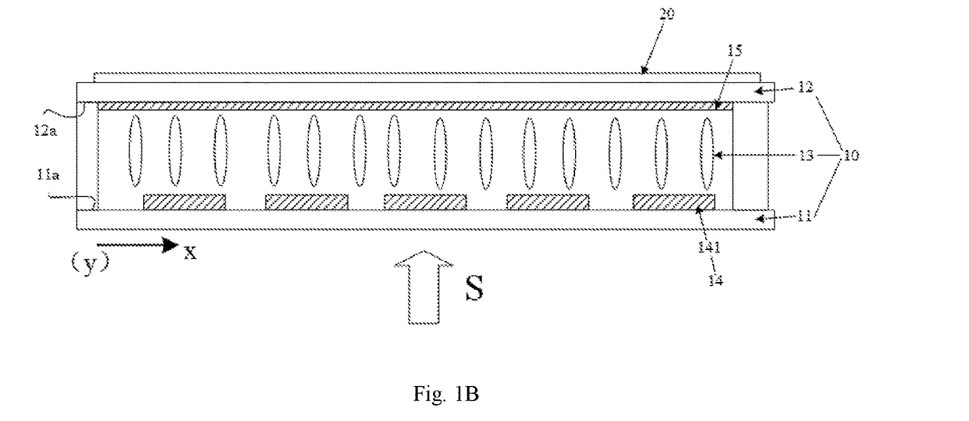
FIG. 1B is a schematic view of a layer structure of a parallax barrier provided by an exemplary embodiment of the present disclosure.

FIGS. 1A and 1B are referred to. FIG. 1A is a schematic view of a plan structure of a parallax barrier provided by an exemplary embodiment of the present disclosure, and FIG. 1B is a schematic view of a layer structure of a parallax barrier provided by an exemplary embodiment of the present disclosure. The parallax barrier may include: a sealed cavity 10 and a first polarizer 20 disposed on a light exiting side of the sealed cavity 10, and the first polarizer is a linear polarizer.

The sealed cavity 10 includes: two substrates parallel to each other and a liquid crystal layer 13 provided between the two substrates.

The two substrates include a first substrate 11 and a second substrate 12, a first transparent electrode layer 14 is provided on a first surface 11a of the first substrate 11 close to the second substrate 12. The first surface 11a is the surface that faces towards the second substrate 12. The first transparent electrode layer 14 is a plurality of transparent electrode blocks 141 arranged in an array along a first direction (x-axis direction) and a second direction (y-axis direction).

A second transparent electrode layer 15 is provided on a second surface 12a of the second substrate 12 close to the first substrate 11. The second surface 12a is the surface that faces towards the first substrate 11. A voltage difference between the second transparent electrode layer 15 and the transparent electrode block 141 may deflect liquid crystal in the liquid crystal layer 13. For example, by controlling applying of voltages on the transparent electrode block 141 in the first transparent electrode layer 14 and the second transparent electrode layer 15, the voltage difference may be adjusted so that the liquid crystal is caused to be deflected or not deflected, thereby adjusting and controlling transparency of the parallax barrier.

A first switch 16 is provided between any two adjacent transparent electrode blocks 141 in the first direction, and a second switch 17 is provided between any two adjacent transparent electrode blocks 141 in the second direction.

A linearly-polarized light S incident from a light entering side of the sealed cavity 10 is able to pass through the first polarizer 20 or be filtered by the first polarizer 20 under control of the liquid crystal in the sealed cavity 10. In other words, the liquid crystal layer controls whether the light passes through the first polarizer 20 or not.

In the disclosure, when a polarization direction of the first polarizer 20 is perpendicular to a polarization direction of the linearly-polarized light S, the linearly-polarized light S passes through the first polarizer 20 when the liquid crystal in the liquid crystal layer 13 is not deflected, and the linearly-polarized light S is filtered by the first polarizer 20 when the liquid crystal in the liquid crystal layer 13 is deflected. When the polarization direction of the first polarizer 20 is the same as the polarization direction of the linearly-polarized light S, the linearly-polarized light S passes through the first polarizer 20 when the liquid crystal in the liquid crystal layer 13 is deflected, and the linearly-polarized light S is filtered by the first polarizer 20 when the liquid crystal in the liquid crystal layer 13 is not deflected.

In the disclosure, there are generally two ways to form a voltage difference between the second transparent electrode layer 15 and the transparent electrode block 141. n a first example, a voltage is applied to the second transparent electrode layer 15, and a voltage is also applied to the transparent electrode block 141, but values of the two voltages are different. In a second example, no voltage is applied to the second transparent electrode layer 15 (usually being grounded), and a voltage is applied to the transparent electrode block 141.

Similarly, there are generally two ways to not form a voltage difference between the second transparent electrode layer 15 and the transparent electrode block 141. In a first example, a voltage is applied to the second transparent electrode layer 15, and a voltage is also applied to the transparent electrode block 141, and values of the two voltages are the same. In a second example, no voltage is applied to either the second transparent electrode layer 15 or the transparent electrode block 141.

In some embodiments, for example, the second transparent electrode layer 15 is grounded (that is, no voltage is applied to the second transparent electrode layer 15 all the time), at this time, by adjusting the applied voltage on the transparent electrode block 141, it may control whether a voltage difference is formed between the second transparent electrode layer 15 and the transparent electrode block 141. That is, when a voltage is applied to the transparent electrode block 141, a voltage difference is formed between the second transparent electrode layer 15 and the transparent electrode block 141, the liquid crystal is deflected. When no voltage is applied to the transparent electrode block 141, no voltage difference is formed between the second transparent electrode layer 15 and the transparent electrode block 141, the liquid crystal is not deflected. In general, a thin film field effect transistor (Thin Film Transistor, TFT) connected to the transparent electrode block 141 may be adopted to control whether a voltage is applied to the transparent electrode block 141 or not. In practical applications, other control methods may refer to the above-described method of adjusting the voltage difference by controlling the transparent electrode block 141, which will not be repeated in the embodiment of the present disclosure.

Figure 1C:
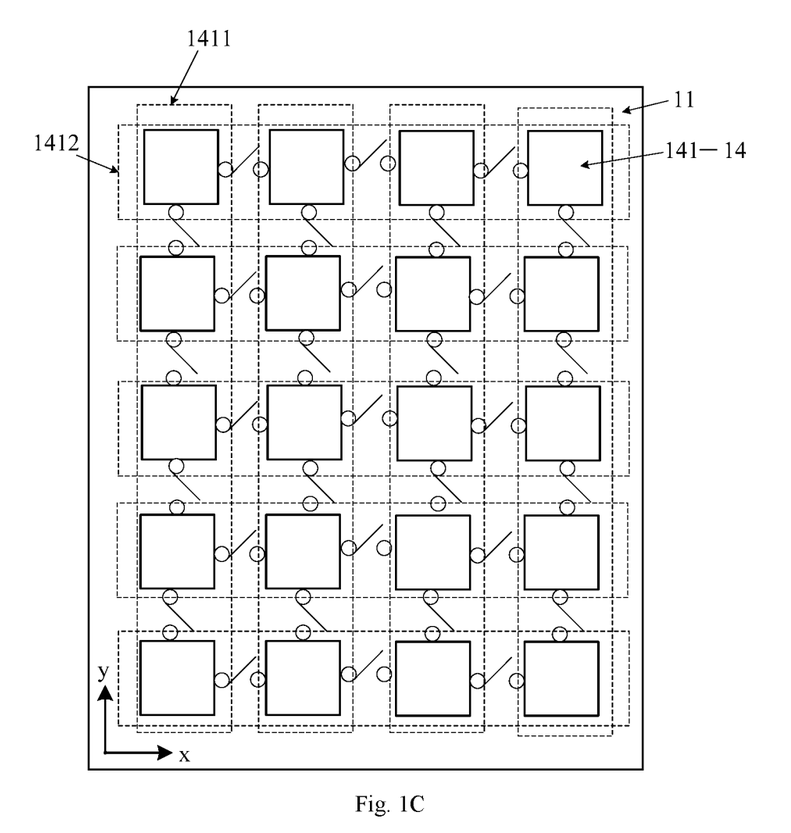
FIG. 1C is a schematic view of a plan structure of a parallax barrier provided by another exemplary embodiment of the present disclosure.

In one or more embodiments of the present disclosure, FIG. 1C is referred to. FIG. 1C is a schematic view of a plan structure of a parallax barrier provided by another exemplary embodiment of the present disclosure. The plurality of transparent electrode blocks 141 are capable of being divided into a plurality of first electrode groups 1411 arranged in an array along a first direction (in FIG. 1C, for example, it is an x-axis direction, i.e., a row direction), each of the first electrode groups 1411 includes a plurality of transparent electrode blocks 141 arranged in a second direction (in FIG. 1C, for example, it is a y-axis direction, i.e., a column direction).

Alternatively or additionally, the plurality of transparent electrode blocks 141 are capable of being divided into a plurality of second electrode groups 1412 arranged in an array along a second direction, each of the second electrode groups 1412 includes a plurality of transparent electrode blocks 141 arranged in a first direction. If one electrode group of any two adjacent first electrode groups 1411 is controlled to form a voltage difference for deflecting the liquid crystal with respect to the second transparent electrode layer, and the other electrode group of any two adjacent first electrode groups 1411 is controlled to form no voltage difference for deflecting the liquid crystal with respect to the second transparent electrode layer, alternatively-arranged light-transmission regions and non-light-transmission regions are formed along the first direction at this time. If one electrode group of any two adjacent second electrode groups 1412 is controlled to form a voltage difference for deflecting the liquid crystal with respect to the second transparent electrode layer, and the other electrode group of any two adjacent second electrode groups 1412 is controlled to form no voltage difference for deflecting the liquid crystal with respect to the second transparent electrode layer, alternatively-arranged light-transmission regions and non-light-transmission regions are formed along the second direction at this time.

In some embodiments of the present disclosure, for example, each of the two adjacent first electrode groups includes a column of transparent electrode blocks, or each of the two adjacent second electrode groups includes a row of transparent electrode blocks. In practical applications, each of the two adjacent first electrode groups may include the transparent electrode blocks of different numbers of columns, or each of the two adjacent second electrode groups may include the transparent electrode blocks of different numbers of rows. For example, one electrode group of two adjacent first electrode groups may include one column of transparent electrode blocks, and the other electrode group of the two adjacent first electrode groups may include two columns of transparent electrode blocks.

Alternatively or additionally, one electrode group of two adjacent second electrode groups may include one row of transparent electrode blocks, and the other electrode group of the two adjacent second electrode groups may include two rows of transparent electrode blocks. The manner of dividing the transparent electrode blocks is not particularly limited by the embodiment of the present disclosure.

In view of the above, in the parallax barrier provided by the embodiment of the present disclosure, by controlling the plurality of transparent electrode blocks arranged in an array along the first direction and the second direction, liquid crystal in the parallax barrier corresponding to the transparent electrode blocks controlled in the first direction is deflected, or liquid crystal in the parallax barrier corresponding to the transparent electrode blocks controlled in the second direction is deflected, thus the parallax barrier can protect privacy in two directions, which improves flexibility and reliability of the privacy protection.

Figure 2:
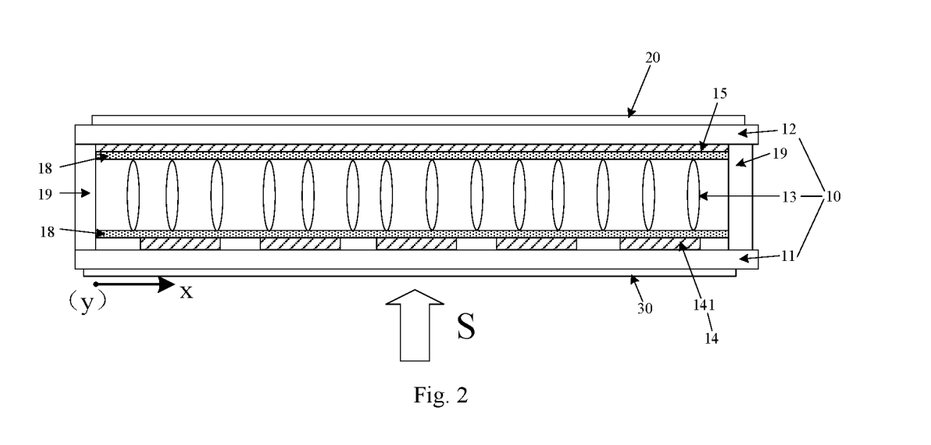
FIG. 2 is a schematic view of a layer structure of a parallax barrier provided by another exemplary embodiment of the present disclosure.

FIG. 2 is a schematic view of a layer structure of a parallax barrier provided by another exemplary embodiment of the present disclosure. The parallax barrier may further include a second polarizer 30 provided on the light entering side of the sealed cavity 10, a polarization direction of the second polarizer 30 has a preset angle with the polarization direction of the first polarizer 20, and a light incident into the sealed cavity 10 through the second polarizer 30 is the linearly-polarized light S. The preset angle may be ninety degrees or close to ninety degrees. When no voltage difference for deflecting the liquid crystal is formed between the second transparent electrode layer 15 and the transparent electrode blocks 141 (i.e., no voltage is applied to both the second transparent electrode layer 15 and the transparent electrode blocks 141), all the polarized light S may emit out through the first polarizer 20 after passing through the liquid crystal layer 13. In practical applications, it is necessary to provide alignment layers 18 for carrying the liquid crystal on both sides of the liquid crystal layer 13, and a sealant frame 19 is provided around the liquid crystal layer 13. The sealant frame 19 may prevent the liquid crystal from leaking from the sealed cavity 10.

In FIG. 2, each of the first transparent electrode layer 14 and the second transparent electrode layer 15 is formed of Indium Tin Oxide (ITO). Each transparent electrode block 141 in the first transparent electrode 14 has a square structure.

Figure 3:
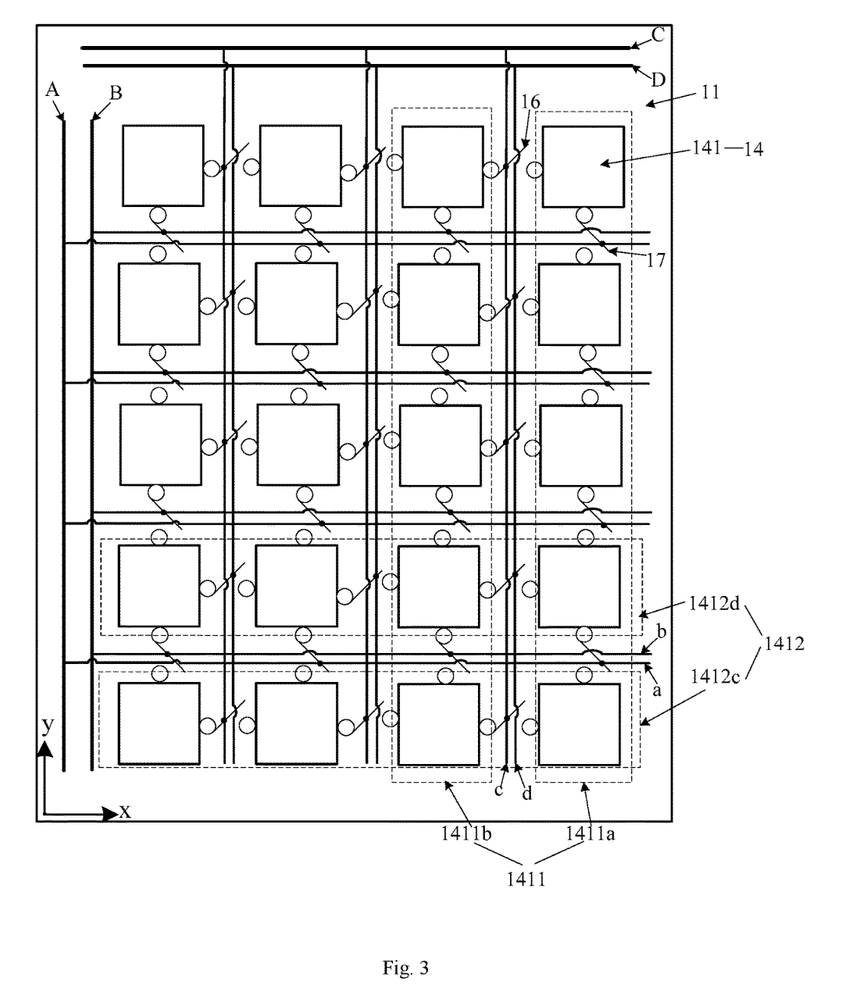
FIG. 3 is a schematic view of a plan structure of a parallax barrier provided by yet another exemplary embodiment of the present disclosure.

FIG. 3 is a schematic view of a plan structure of a parallax barrier provided by yet another exemplary embodiment of the present disclosure. The first direction (in FIG. 3, for example, it is an x-axis direction, i.e., a row direction) is perpendicular to the second direction (in FIG. 3, for example, it is a y-axis direction, i.e., a column direction). Each of the first switch 16 and the second switch 17 is a TFT switch.

As an example, as shown in FIG. 3, in any two adjacent first electrode groups, each of the second switches 17 in one first electrode group 1411a is connected to a control line a, and each of the second switches 17 in the other first electrode group 1411*b* is connected to a control line b. In any two adjacent second electrode groups, each of the first switches 16 in one second electrode group 1412*c* is connected to a control line c, and each of the first switches 16 in the other second electrode group 1412*d* is connected to a control line d. Each control line a is connected to a control bus A, each control line b is connected to a control bus B, each control line c is connected to a control bus C, and each control line d is connected to a control bus D.

Figure 4A:
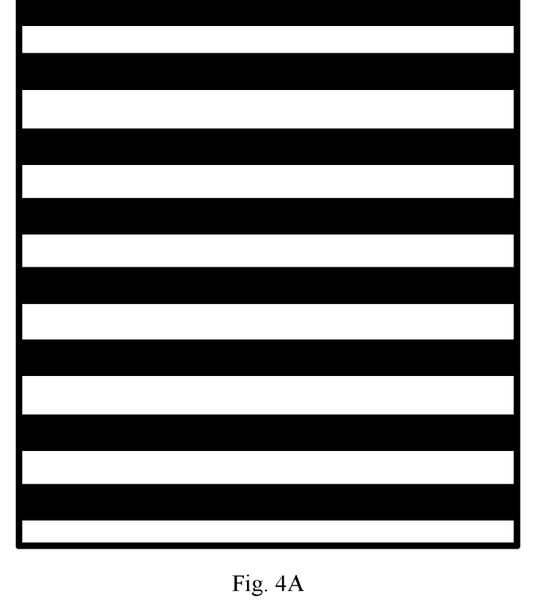
FIG. 4A is an effect diagram of a parallax barrier in a shielding state provided by an exemplary embodiment of the present disclosure.
Figure 4B:
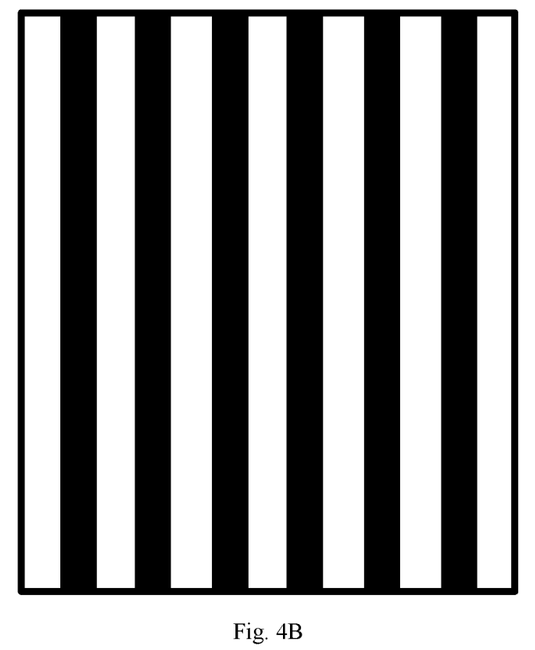
FIG. 4B is an effect diagram of a parallax barrier in a shielding state provided by another exemplary embodiment of the present disclosure.

FIGS. 4A and 4B are referred to. FIG. 4A is an effect diagram of a parallax barrier in a shielding state provided by an exemplary embodiment of the present disclosure, and FIG. 4B is an effect diagram of a parallax barrier in a shielding state provided by another exemplary embodiment of the present disclosure. In FIGS. 4A and 4B, the white regions are the light-transmission regions, and the black regions are the non-light-transmission regions.

For example, when the shielding state as shown in FIG. 4A is required to be formed, a voltage may be applied to the control bus C, while no voltage is applied to the control buses A, B, D. Alternatively, a voltage may be applied to the control bus D, while no voltage is applied to the control buses A, B, and C. At this time, a voltage difference for deflecting the liquid crystal is formed between one electrode group of any two adjacent second electrode groups and the second transparent electrode layer, and no voltage difference for deflecting the liquid crystal is formed between the other electrode group of the two adjacent second electrode groups and the second transparent electrode layer, thus forming light-transmission regions and non-light-transmission alternatively-arranged along the second direction. When the shielding state as shown in FIG. 4B is required to be formed, a voltage may be applied to the control bus A, while no voltage is applied to the control buses B, C, D. Alternatively, a voltage may be applied to the control bus B, while no voltage is applied to the control buses A, C, and D. At this time, a voltage difference for deflecting the liquid crystal is formed between one electrode group of any two adjacent first electrode groups and the second transparent electrode layer, and no voltage difference for deflecting the liquid crystal is formed between the other electrode group of any two adjacent first electrode groups and the second transparent electrode layer, thus forming light-transmission regions and non-light-transmission alternatively-arranged along the first direction.

In view of the above, in the parallax barrier provided by the embodiment of the present disclosure, by controlling the plurality of transparent electrode blocks arranged in an array along the first direction and the second direction, liquid crystal in the parallax barrier corresponding to the transparent electrode blocks controlled in the first direction is deflected, or liquid crystal in the parallax barrier corresponding to the transparent electrode blocks controlled in the second direction is deflected, thus the parallax barrier can protect privacy in two directions, which improves flexibility and reliability of the privacy protection.

Figure 5:
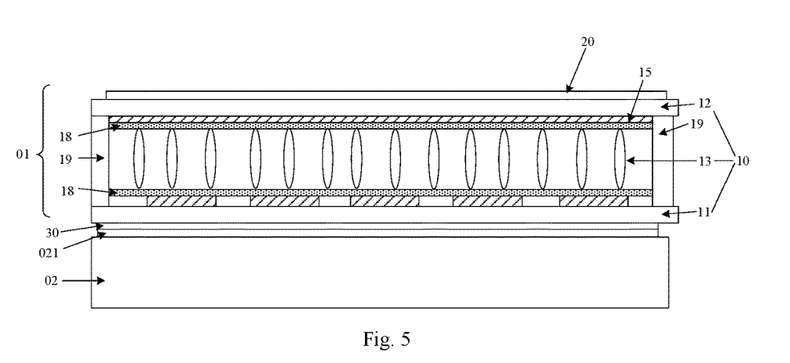
FIG. 5 is a schematic view of a structure of a display device provided by an exemplary embodiment of the present disclosure.

FIG. 5 is a schematic view of a structure of a display device provided by an exemplary embodiment of the present disclosure. The display device may include: a display panel 02 and a parallax barrier 01 provided on a light emitting surface of the display panel 02, the parallax barrier 01 being the parallax barrier as shown in FIG. 2.

Optionally, as shown in FIG. 5, the first polarizer 20 provided on a side of the parallax barrier 01 is away from a light exiting surface of the display panel 02, and the second polarizer 30 provided on the other side of the parallax barrier 01 is close to light exiting surface of the display panel 02.

The display device may further include: a third polarizer 021 provided on a side of the display panel 02 close to the sealed cavity 10. The third polarizer 021 and the second polarizer 30 may be of an integrated structure. That is, only one polarizer is required to be provided between the parallax barrier 01 and the display panel 02.

Optionally, the display device further includes: a plurality of crosswise arranged gate lines and data lines, the first direction (which may also be regarded as the row direction) in the parallax barrier is a scanning direction of the gate line, and the second direction (which may also be regarded as the column direction) is a scanning direction of the data line.

In the embodiment of the present disclosure, the display panel includes a plurality of pixel units arranged in an array along the scanning direction of the gate line and the scanning direction of data line. Each of the pixel units is located in a region surrounded by the crosswise arranged gate lines and data lines. Each of the pixel units may include a red sub-pixel, a green sub-pixel and a blue sub-pixel. A size of the transparent electrode block in the parallax barrier may be the same as the size of the pixel units in the display panel.

In practical applications, the display device may further include a sensor component and a controller, wherein the sensor component is configured to acquire a content display direction of the display device, and the controller is configured to control on or off of the corresponding switch in the parallax barrier according to the content display direction. Optionally, the sensor component is a gravity sensor. For example, the controller may switch on the first switch to turn on the barriers in the first direction when the content display direction is in the second direction. Alternatively, the controller may switch on the second switch to turn on the barriers in the second direction when the content display direction is in the first direction.

It will be apparent to those skilled in the art that, for convenience and simplicity of the description, the specific operation process of the display device described above may refer to the corresponding process in the embodiments of the method described below, which will not be described herein.

In view of the above, in the display device provided by the embodiment of the present disclosure, by controlling the plurality of transparent electrode blocks arranged in an array along the first direction and the second direction, liquid crystal in the parallax barrier corresponding to the transparent electrode blocks controlled in the first direction is deflected, or liquid crystal in the parallax barrier corresponding to the transparent electrode blocks controlled in the second direction is deflected, thus the parallax barrier can protect privacy in two directions, which improves flexibility and reliability of the privacy protection.

Figure 6:
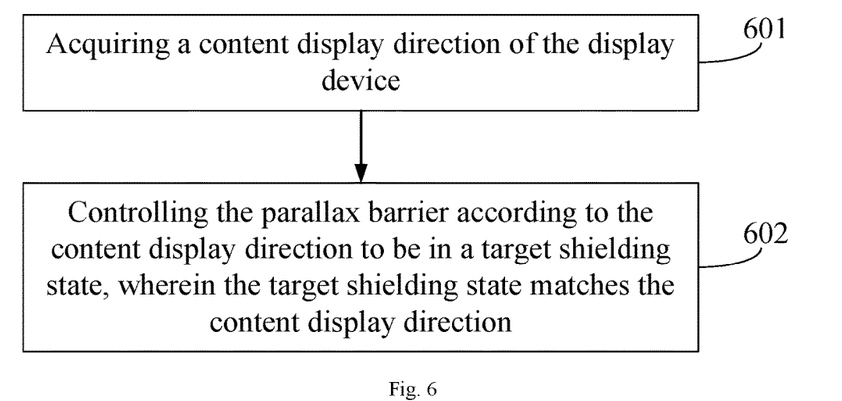
FIG. 6 is a flow chart of a display state control method provided by an exemplary embodiment of the present disclosure.

FIG. 6 is a flow chart of a display state control method provided by one or more exemplary embodiments of the present disclosure. The display state control method is used to control the parallax barrier in the display device to be in a target shielding state. The method may include following steps.

In step 601, a content display direction of the display device is acquired.

In step 602, the parallax barrier is controlled according to the content display direction to be in a target shielding state, wherein the target shielding state matches the content display direction.

Here, the target shielding state is a first shielding state or a second shielding state. The first shielding state is a state that the parallax barrier presents when a voltage difference for deflecting the liquid crystal is formed between one electrode group of any two adjacent first electrode groups of the plurality of first electrode groups and the second transparent electrode layer form, and no voltage difference for deflecting the liquid crystal is formed between the other electrode group of the two adjacent first electrode groups of the plurality of first electrode groups and the second transparent electrode layer, and the first shielding state may refer to the shielding state as shown in FIG. 4B. The second shielding state is a state that the parallax barrier presents when a voltage difference for deflecting the liquid crystal is formed between one electrode group of any two adjacent second electrode groups of the plurality of second electrode groups and the second transparent electrode layer, and no voltage difference for deflecting the liquid crystal is formed between the other electrode group of the two adjacent second electrode groups of the plurality of second electrode groups and the second transparent electrode layer, and the second shielding state may refer to the shielding state as shown in FIG. 4A.

In view of the above, in the flow chart of the state control method provided by an exemplary embodiment of the present disclosure, by controlling the plurality of transparent electrode blocks arranged in an array along the first direction and the second direction, liquid crystal in the parallax barrier corresponding to the transparent electrode blocks controlled in the first direction is deflected, or liquid crystal in the parallax barrier corresponding to the transparent electrode blocks controlled in the second direction is deflected, thus the parallax barrier can protect privacy in two directions, which improves flexibility and reliability of the privacy protection.

Figure 7A:
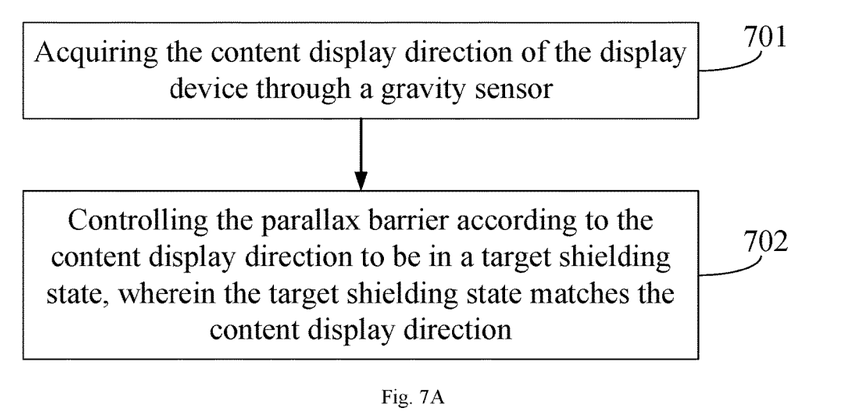
FIG. 7A is a flow chart of a display state control method provided by another exemplary embodiment of the present disclosure.

FIG. 7A is a flow chart of a display state control method provided by another exemplary embodiment of the present disclosure. The display state control method is used to control the parallax barrier in the display device to be in a target shielding state. The method may include following steps.

In step 701, the content display direction of the display device is acquired through a gravity sensor.

Figure 7B:
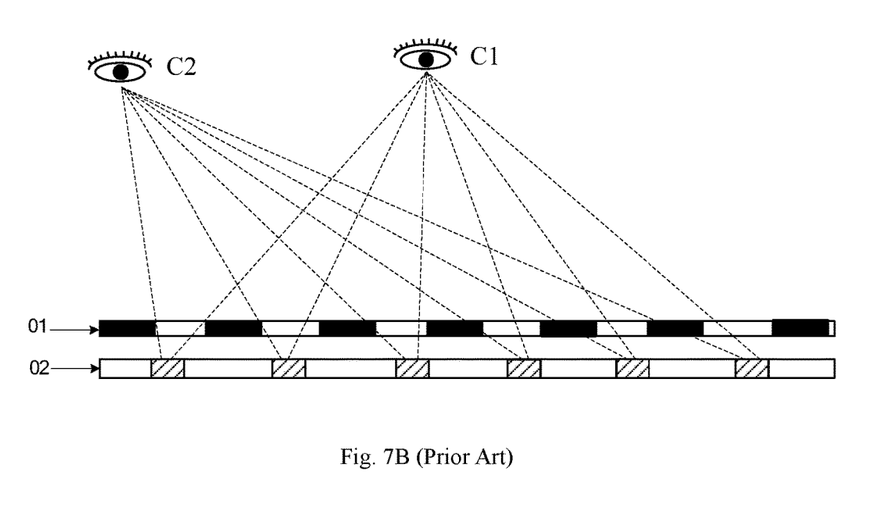
FIG. 7B is a principle diagram of the related art when the display device is in a private display mode.

Optionally, while performing the step 701, it is also necessary to determine that the display device is in a private display mode. FIG. 7B is referred to. FIG. 7B is a principle diagram o the related art when the display device is in a private display mode. In the private display mode, the parallax barrier 01 is in the shielding state, and at this time, a user (i.e., a person who uses of the display device) at C1 may view the whole display content on the display panel 02, while sight of another user at C2 is limited by the parallax barrier 01, and he/she cannot view or completely view the display content of the display panel 02. The principle of the display device provided in the embodiment of the present disclosure is the same as that of the related art when it is in the private display mode, which will not be repeated herein.

In step 702, the parallax barrier is controlled according to the content display direction to be in a target shielding state, wherein the target shielding state matches the content display direction.

In the example, the correspondence relationship between the shielding state of the parallax barrier and the content display direction may be as shown in Table 1. When it is acquired that the display content direction is the second direction, the corresponding parallax barrier is in the first shielding state. When it is acquired that the display content direction is the first direction, the corresponding parallax barrier is in the second shielding state.

TABLE 1

| content display direction of the display device | shielding state of the parallax barrier |
| --- | --- |
| first direction | second shielding state |
| second direction | first shielding state |

In the disclosure, when it is acquired that the display content direction is the second direction, it is controlled to form a voltage difference for deflecting the liquid crystal between one electrode group of any two adjacent first electrode groups of the plurality of first electrode groups in the parallax barrier and the second transparent electrode layer, and no voltage difference for deflecting the liquid crystal is formed between the other electrode group of the two adjacent first electrode groups of the plurality of first electrode groups in the parallax barrier and the second transparent electrode layer. At this time, the enabled first electrode groups and the disabled first electrode groups are arranged alternatively, so the parallax barrier is in the first shielding state, such that the light emitted from the display panel is partially transmitted and partially blocked. When it is acquired that the display content direction is the first direction, it is controlled to form a voltage difference for deflecting the liquid crystal between one electrode group of any two adjacent second electrode groups of the plurality of second electrode groups in the parallax barrier and the second transparent electrode layer, and no voltage difference for deflecting the liquid crystal is formed between the other electrode group of the two adjacent second electrode groups of the plurality of second electrode groups in the parallax barrier and the second transparent electrode layer. At this time, the enabled first electrode groups and the disabled first electrode groups are arranged alternatively, so the parallax barrier is in the second shielding state, such that the light emitted from the display panel is partially transmitted and partially blocked.

Figure 7C:
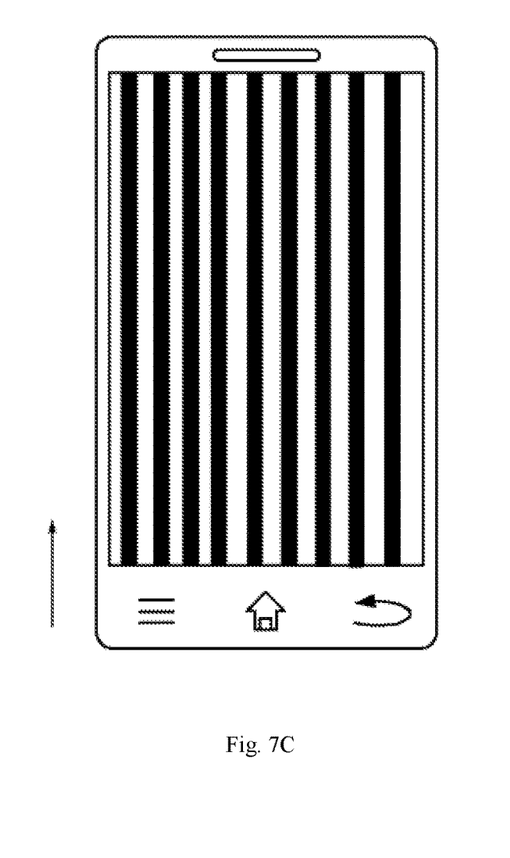
FIG. 7C is an effect diagram of a corresponding shielding state when a content display direction of the display device is a second direction.
Figure 7D:
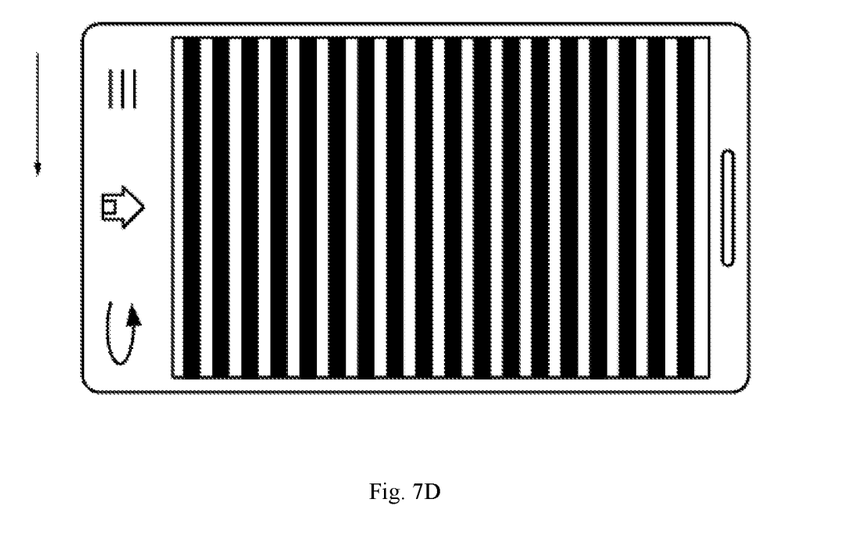
FIG. 7D is an effect diagram of a corresponding shielding state when a content display direction of the display device is a first direction provided by an exemplary embodiment of the present disclosure.
Figure 7E:
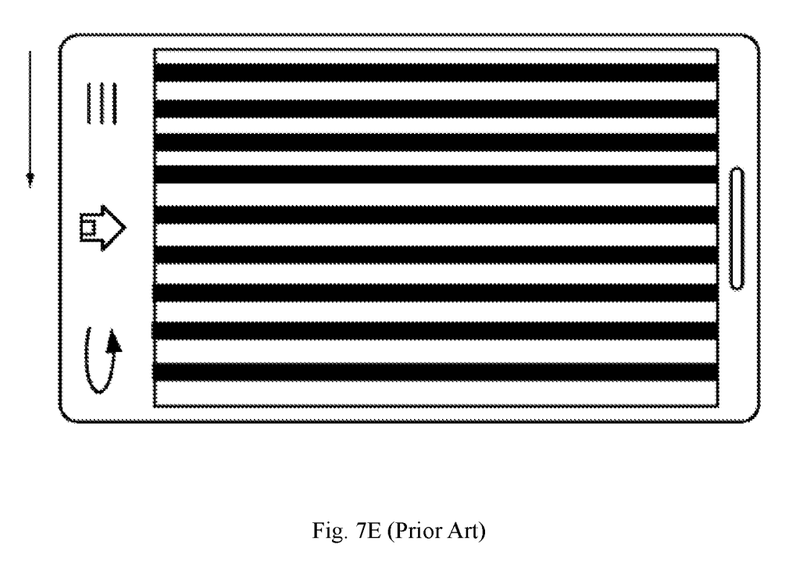
FIG. 7E is an effect diagram of a corresponding shielding state when a content display direction of the display device is a first direction provided by the related art.

FIG. 7C is an effect diagram of a corresponding shielding state when a content display direction of the display device is a second direction. FIG. 7D is an effect diagram of a corresponding shielding state when a content display direction of the display device is a first direction provided by an exemplary embodiment of the present disclosure. FIG. 7E is an effect diagram of a corresponding shielding state when a content display direction of the display device is a first direction provided by the related art. Here, the content may include image, video, text, or a combination of the different types of content. Accordingly, the content display direction may include the orientation of an image or video displayed on the screen, the direction of texts or other content.

It can be seen from the above three figures, when the content display direction of the display device in the related art is the first direction or the second direction, there is only one shielding state, so the reliability of the privacy protection is low. While in the display device provided by the present embodiment, when the content display direction of the display device is the first direction, the parallax barrier in the display device is in the second shielding state, and when the content display direction of the display device is the second direction, the parallax barrier in the display device is in the first shielding state. The different content display directions in the display device correspond to different shielding states, which improves reliability of the privacy protection.

It will be apparent to those skilled in the art that, for convenience and simplicity of the description, the specific control principle that the display device controls the parallax barrier to be in the target shielding state described above may refer to the embodiment of the parallax barrier structure described above, which will not be described herein.

In view of the above, in the flow chart of the state control method provided by an exemplary embodiment of the present disclosure, by controlling the plurality of transparent electrode blocks arranged in an array along the first direction and the second direction, liquid crystal in the parallax barrier corresponding to the transparent electrode blocks controlled in the first direction is deflected, or liquid crystal in the parallax barrier corresponding to the transparent electrode blocks controlled in the second direction is deflected, thus the parallax barrier can protect privacy in two directions, which improves flexibility and reliability of the privacy protection.

It will be understood by those skilled in the art that all or part of the steps of implementing the embodiments described above may be accomplished by hardware, or may be accomplished by instructing the associated hardware through instructions. The instructions may be stored in a computer readable storage medium. The above mentioned storage medium may be a read-only memory, a magnetic disk, or an optical disk.

The foregoing is merely a preferred embodiment of the present disclosure and is not intended to limit the present disclosure. Any modifications, equivalent substitutions, improvements, and the like within the spirit and principle of the present disclosure are intended to be encompassed by the protection scope of the present disclosure.

What is claimed is:

1. A parallax barrier, comprising:
a sealed cavity and a first polarizer disposed on a light exiting side of the sealed cavity,
wherein the sealed cavity comprises: a first substrate and a second substrate parallel to each other and a liquid crystal layer between the first substrate and the second substrate,
wherein a first transparent electrode layer is provided on a first surface of the first substrate close to the second substrate, and the first transparent electrode layer is a plurality of transparent electrode blocks arranged in an array along a first direction and a second direction,
wherein a second transparent electrode layer is provided on a second surface of the second substrate close to the first substrate, and a voltage difference between the second transparent electrode layer and the transparent electrode block is configured to deflect liquid crystal in the liquid crystal layer,
wherein a first switch is provided between two adjacent transparent electrode blocks in the first direction, and a second switch is provided between two adjacent transparent electrode blocks in the second direction, and
wherein the liquid crystal layer controls whether a linearly-polarized light incident from a light entering side of the sealed cavity to pass through the first polarizer or be filtered by the first polarizer.

2. The parallax barrier according to claim 1, wherein the parallax barrier further comprises: a second polarizer provided on the light entering side of the sealed cavity, a polarization direction of the second polarizer has a preset angle with a polarization direction of the first polarizer, and a light incident into the sealed cavity through the second polarizer is the linearly-polarized light.

3. The parallax barrier according to claim 2, wherein the preset angle is ninety degrees.

4. The parallax barrier according to claim 1, wherein the first direction is perpendicular to the second direction.

5. The parallax barrier according to claim 1, wherein each of the first switch and the second switch is a thin film field effect transistor TFT switch.

6. The parallax barrier according to claim 1, wherein each of the first transparent electrode layer and the second transparent electrode layer is formed of Indium Tin Oxide ITO.

7. The parallax barrier according to claim 1, wherein each of the transparent electrode blocks has a square structure.

8. A display device, comprising: a display panel and a parallax barrier provided on a light emitting surface of the display panel, wherein the parallax barrier comprises:
a sealed cavity and a first polarizer disposed on a light exiting side of the sealed cavity,
wherein the sealed cavity comprises: two substrates parallel to each other and a liquid crystal layer provided between the two substrates,
wherein the two substrates comprise a first substrate and a second substrate, a first transparent electrode layer is provided on a surface of the first substrate close to the second substrate, and the first transparent electrode layer is a plurality of transparent electrode blocks arranged in an array along a first direction and a second direction,
wherein a second transparent electrode layer is provided on a surface of the second substrate close to the first substrate, and a voltage difference to deflect liquid crystal in the liquid crystal layer is capable of forming between the second transparent electrode layer and the transparent electrode block,
wherein a first switch is provided between two adjacent transparent electrode blocks in the first direction, and a second switch is provided between two adjacent transparent electrode blocks in the second direction, and
wherein the liquid crystal controls whether a linearly-polarized light incident from a light entering side of the sealed cavity passes through the first polarizer or not.

9. The display device according to claim 8, wherein the first polarizer is provided on a surface of the sealed cavity away from the display panel, and the second polarizer is provided on a surface of the sealed cavity close to the display panel, and
the display device further comprises: a third polarizer provided on a side of the display panel close to the sealed cavity, wherein the second polarizer and the third polarizer are integrally formed.

10. The display device according to claim 8, wherein the display device further comprises: a plurality of crosswise arranged gate lines and data lines, the first direction is a scanning direction of the gate line, and the second direction is a scanning direction of the data line.

11. The display device according to claim 8, wherein the display device further comprises a sensor component and a controller, wherein
the sensor component is configured to acquire a content display direction of the display device, and
the controller is configured to switch on at least one of the first switch and the second switch in the parallax barrier according to the content display direction.

12. The display device according to claim 11, wherein the sensor component is a gravity sensor.

13. The display device according to claim 8, wherein the parallax barrier further comprises: a second polarizer provided on the light entering side of the sealed cavity, a polarization direction of the second polarizer has a preset angle with a polarization direction of the first polarizer, and a light incident into the sealed cavity through the second polarizer is the linearly-polarized light.

14. The display device according to claim 13, wherein the first polarizer is provided on a surface of the sealed cavity away from the display panel, and the second polarizer is provided on a surface of the sealed cavity close to the display panel, and
the display device further comprises: a third polarizer provided on a side of the display panel close to the sealed cavity, wherein the second polarizer and the third polarizer are integrally formed.

15. The display device according to claim 13, wherein the display device further comprises: a plurality of crosswise arranged gate lines and data lines, the first direction is a scanning direction of the gate line, and the second direction is a scanning direction of the data line.

16. The display device according to claim 13, wherein the display device further comprises a sensor component and a controller, wherein
the sensor component is configured to acquire a content display direction of the display device, and
the controller is configured to control on or off of the switch in the parallax barrier according to the content display direction.

17. The display device according to claim 16, wherein the sensor component is a gravity sensor.

18. A display state control method, applied to a parallax barrier, wherein the parallax barrier comprises:
a sealed cavity and a first polarizer disposed on a light exiting side of the sealed cavity,
wherein the sealed cavity comprises: two substrates parallel to each other and a liquid crystal layer provided between the two substrates,
wherein the two substrates comprise a first substrate and a second substrate, a first transparent electrode layer is provided on a surface of the first substrate close to the second substrate, and the first transparent electrode layer is a plurality of transparent electrode blocks arranged in an array along a first direction and a second direction,
wherein a second transparent electrode layer is provided on a surface of the second substrate close to the first substrate, and a voltage difference to deflect liquid crystal in the liquid crystal layer is capable of forming between the second transparent electrode layer and the transparent electrode block,
wherein a first switch is provided between any two adjacent transparent electrode blocks in the first direction, and a second switch is provided between any two adjacent transparent electrode blocks in the second direction, and
wherein the liquid crystal layer controls whether a linearly-polarized light incident from a light entering side of the sealed cavity passes through the first polarizer or not, and wherein the plurality of transparent electrode blocks are capable of being divided into a plurality of first electrode groups arranged in an array along a first direction, and each of the first electrode groups comprises a plurality of transparent electrode blocks is arranged in a second direction, or the plurality of transparent electrode blocks are capable of being divided into a plurality of second electrode groups arranged in an array along a second direction, and each of the second electrode groups comprises a plurality of transparent electrode blocks is arranged in a first direction, and the method comprises:
acquiring a content display direction of the display device; and
controlling the parallax barrier according to the content display direction to be in a target shielding state, wherein the target shielding state matches the content display direction,
wherein the target shielding state is a first shielding state or a second shielding state, and the first shielding state is a state that the parallax barrier presents when a voltage difference for deflecting the liquid crystal is formed between one electrode group of any two adjacent first electrode groups of the plurality of first electrode groups and the second transparent electrode layer, and no voltage difference for deflecting the liquid crystal is formed between the other electrode group of the two adjacent first electrode groups of the plurality of first electrode groups and the second transparent electrode layer, and
the second shielding state is a state that the parallax barrier presents when a voltage difference for deflecting the liquid crystal is formed between one electrode group of any two adjacent second electrode groups of the plurality of second electrode groups and the second transparent electrode layer, and no voltage difference for deflecting the liquid crystal is formed between the other electrode group of the two adjacent second electrode groups of the plurality of second electrode groups and the second transparent electrode layer.

19. The method according to claim 18, wherein acquiring a content display direction of the display device comprises:
acquiring the content display direction of the display device through a gravity sensor.

20. The method according to claim 18, wherein the parallax barrier further comprises: a second polarizer provided on the light entering side of the sealed cavity, a polarization direction of the second polarizer has a preset angle with a polarization direction of the first polarizer, and a light incident into the sealed cavity through the second polarizer is the linearly-polarized light.

* * * * *